(12) United States Patent
Dave et al.

(10) Patent No.: US 10,051,110 B2
(45) Date of Patent: Aug. 14, 2018

(54) MANAGEMENT OF MOVEMENT STATES OF AN ELECTRONIC DEVICE

(71) Applicant: Apple Inc., Cupertino, CA (US)

(72) Inventors: Swapnil R. Dave, Santa Clara, CA (US); Ioan V. Uilecan, Cupertino, CA (US); Varun A. Vora, Sunnyvale, CA (US)

(73) Assignee: APPLE INC., Cupertino, CA (US)

(*) Notice: Subject to any disclaimer, the term of this patent is extended or adjusted under 35 U.S.C. 154(b) by 89 days.

(21) Appl. No.: 14/013,691

(22) Filed: Aug. 29, 2013

(65) Prior Publication Data
US 2015/0065107 A1    Mar. 5, 2015

(51) Int. Cl.
| | | |
|---|---|---|
| H04M 3/00 | (2006.01) | |
| H04M 1/725 | (2006.01) | |
| G01C 21/00 | (2006.01) | |
| G01C 21/20 | (2006.01) | |
| G06Q 10/02 | (2012.01) | |
| G06Q 10/10 | (2012.01) | |

(52) U.S. Cl.
CPC ...... *H04M 1/72572* (2013.01); *G01C 21/005* (2013.01); *G01C 21/20* (2013.01); *G06Q 10/02* (2013.01); *G06Q 10/109* (2013.01); *H04M 1/72566* (2013.01); *H04M 2250/04* (2013.01); *H04M 2250/12* (2013.01)

(58) Field of Classification Search
CPC ............. H04M 1/658; H04M 1/72572; H04M 3/4878; H04M 15/84; H04W 4/12
See application file for complete search history.

(56) References Cited

U.S. PATENT DOCUMENTS

| | | | |
|---|---|---|---|
| 8,385,901 B2 | 2/2013 | Featherstone et al. | |
| 2011/0070863 A1 | 3/2011 | Ma et al. | |
| 2011/0126119 A1 | 5/2011 | Young et al. | |
| 2012/0303271 A1 | 11/2012 | Chowdhary et al. | |
| 2013/0080457 A1 | 3/2013 | Narayanan et al. | |
| 2013/0295956 A1* | 11/2013 | Ding et al. ................. | 455/456.1 |
| 2014/0047331 A1* | 2/2014 | Feldman ................. | H04L 67/10 715/273 |
| 2015/0077228 A1* | 3/2015 | Dua ............................ | 340/5.81 |

* cited by examiner

*Primary Examiner* — Keith Fang
(74) *Attorney, Agent, or Firm* — Van Court & Aldridge LLP

(57) ABSTRACT

Systems, methods, and computer-readable media for managing movement states of an electronic device are provided that may leverage pass data from a pass application when determining a current or future movement state of an electronic device and/or that may manage a mode of operation of the electronic device based on the determined movement state. Pass data may be indicative of the existence or use of any suitable passes that may be used by the electronic device, such as transportation boarding passes, event tickets, coupons, store cards, financial payment cards, and the like.

24 Claims, 5 Drawing Sheets

US 10,051,110 B2

MANAGEMENT OF MOVEMENT STATES OF AN ELECTRONIC DEVICE

TECHNICAL FIELD

This disclosure relates to the management of movement states of an electronic device and, more particularly, to the management of movement states of an electronic device using data from a pass application.

BACKGROUND OF THE DISCLOSURE

A portable electronic device (e.g., a cellular telephone) may be provided with one or more motion-sensing components (e.g., accelerometers, gyroscopes, etc.) that may be utilized for determining a movement state of the electronic device (e.g., whether the device is stationary or in motion). Often times, however, the data provided by such motion-sensing components is insufficient on its own to enable a reliable determination of a device movement state.

SUMMARY OF THE DISCLOSURE

This document describes systems, methods, and computer-readable media for managing movement states of an electronic device using data from a pass application.

For example, a method for operating an electronic device may include accessing motion sensor data from a motion-sensing component of the electronic device, accessing pass data from a pass application of the electronic device, accessing calendar data from a calendar application of the electronic device, and determining a movement state of the electronic device based on the accessed motion sensor data, the accessed pass data, and the accessed calendar data.

As another example, a method for operating an electronic device may include accessing motion sensor data from a motion-sensing component of the electronic device, accessing pass data from a pass application of the electronic device, and determining a movement state of the electronic device based on the accessed motion sensor data and the accessed pass data, where the pass data may include pass information descriptive of a pass, and where the determining may include detecting that the pass information is descriptive of at least one pass time of the following pass times for the pass: a redemption time of the pass, an event start time associated with the pass, and an event end time associated with the pass.

As yet another example, an electronic device may include a motion-sensing component and a processor configured to access motion sensor data from the motion-sensing component, access pass data from a pass application, and determine a movement state of the electronic device based on the accessed motion sensor data and the accessed pass data.

As yet another example, a non-transitory computer-readable medium for controlling an electronic device may include computer-readable instructions recorded thereon for accessing motion sensor data from a motion-sensing component of the electronic device, accessing pass data from a pass application of the electronic device, and determining a movement state of the electronic device based on the accessed motion sensor data and the accessed pass data.

As yet another example, a data processing system, may include a processor to execute instructions and a memory coupled with the processor to store instructions, which when executed by the processor, cause the processor to perform operations to generate an application programming interface ("API") that allows an API-calling component to perform the following operations: access motion sensor data from a motion-sensing component of the electronic device, access pass data from a pass application of the electronic device, and determine a movement state of the electronic device based on the accessed motion sensor data and the accessed pass data.

This Summary is provided merely to summarize some example embodiments, so as to provide a basic understanding of some aspects of the subject matter described in this document. Accordingly, it will be appreciated that the features described in this Summary are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The discussion below makes reference to the following drawings, in which like reference characters may refer to like parts throughout, and in which.

DETAILED DESCRIPTION OF THE DISCLOSURE

Systems, methods, and computer-readable media may be provided to manage movement states of an electronic device (e.g., to determine a movement state of an electronic device and to manage a mode of operation of the electronic device based on the determined movement state). In addition to leveraging motion sensor data that may be provided by a motion-sensing component, a movement management system may also leverage various other types of data accessible to the electronic device in order to determine the current movement state of the device (e.g., whether the device is currently stationary or in motion). Such various other types of data may be provided by a pass application and/or by any other suitable application, such as a calendar application. In response to determining the current movement state of the device, the movement management system may apply at least one movement-based mode of operation to an element (e.g., a component or application) of the device based on the determined current movement state.

Figure 1:
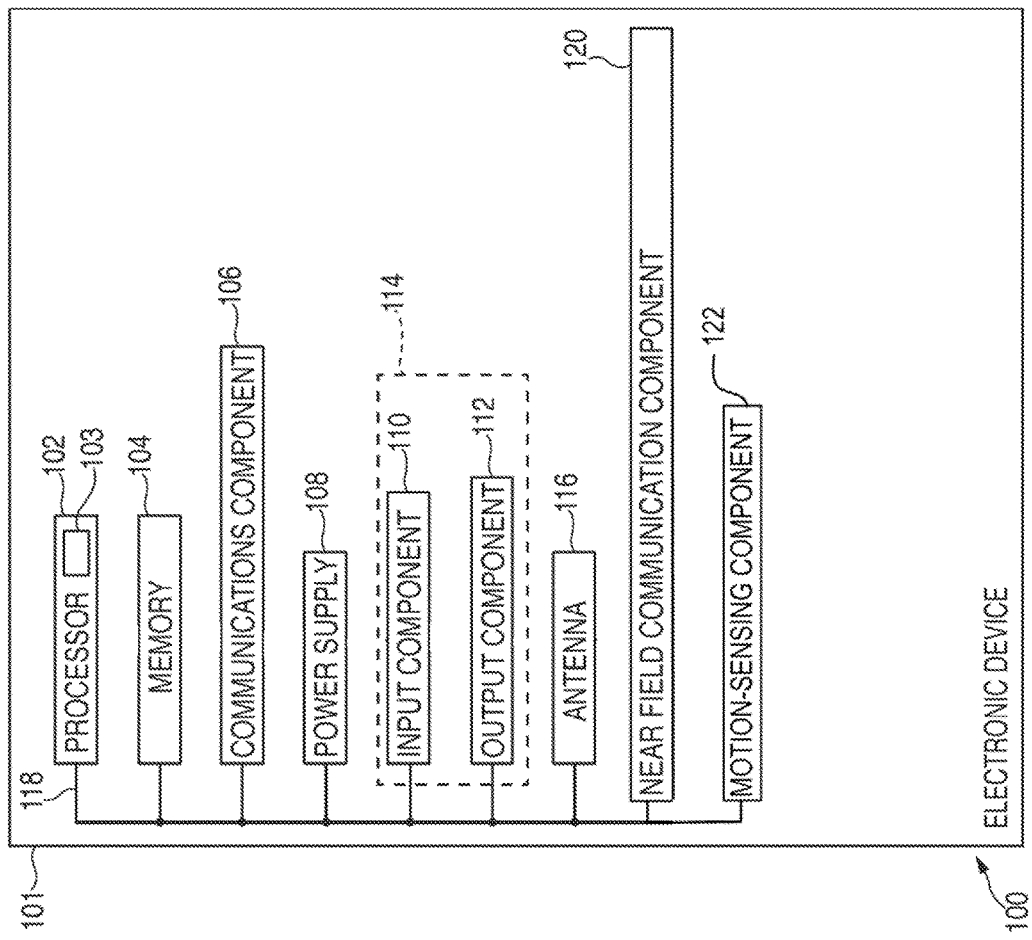
FIG. 1 is a schematic view of an illustrative electronic device for managing movement states.

FIG. 1 is a schematic view of an illustrative electronic device 100 for managing movement states in accordance with some embodiments. Electronic device 100 can include, but is not limited to, a music player (e.g., an iPod™ available by Apple Inc. of Cupertino, Calif.), video player, still image player, game player, other media player, music recorder, movie or video camera or recorder, still camera, other media recorder, radio, medical equipment, domestic appliance, transportation vehicle instrument, musical instrument, calculator, cellular telephone (e.g., an iPhone™ available by Apple Inc.), other wireless communication device, personal digital assistant, remote control, pager, computer (e.g., a desktop, laptop, tablet (e.g., an iPad™ available by Apple Inc.), server, etc.), monitor, television, stereo equipment, set up box, set-top box, boom box, modem, router, printer, or any combination thereof. In some embodiments, electronic device 100 may perform a single function (e.g., a device dedicated to managing movement states) and, in other embodiments, electronic device 100 may perform multiple functions (e.g., a device that manages movement states, plays music, and receives and transmits telephone calls).

Electronic device 100 may be any portable, mobile, hand-held, or miniature electronic device that may be configured to manage movement states of device 100 wherever a user travels. Some miniature electronic devices may have a form factor that is smaller than that of hand-held electronic devices, such as an iPod™. Illustrative miniature electronic devices can be integrated into various objects that may include, but are not limited to, watches, rings, necklaces, belts, accessories for belts, headsets, accessories for shoes, virtual reality devices, glasses, other wearable electronics, accessories for sporting equipment, accessories for fitness equipment, key chains, or any combination thereof. Alternatively, electronic device 100 may not be portable at all, but may instead be generally stationary.

As shown in FIG. 1, for example, electronic device 100 may include a processor 102, memory 104, communications component 106, power supply 108, input component 110, output component 112, antenna 116, near field communication ("NFC") component 120, and motion-sensing component 122. Electronic device 100 may also include a bus 118 that may provide one or more wired or wireless communication links or paths for transferring data and/or power to, from, or between various other components of device 100. In some embodiments, one or more components of electronic device 100 may be combined or omitted. Moreover, electronic device 100 may include any other suitable components not combined or included in FIG. 1 and/or several instances of the components shown in FIG. 1. For the sake of simplicity, only one of each of the components is shown in FIG. 1.

Memory 104 may include one or more storage mediums, including for example, a hard-drive, flash memory, permanent memory such as read-only memory ("ROM"), semi-permanent memory such as random access memory ("RAM"), any other suitable type of storage component, or any combination thereof. Memory 104 may include cache memory, which may be one or more different types of memory used for temporarily storing data for electronic device applications. Memory 104 may be fixedly embedded within electronic device 100 or may be incorporated onto one or more suitable types of cards that may be repeatedly inserted into and removed from electronic device 100 (e.g., a subscriber identity module ("SIM") card or secure digital ("SD") memory card). Memory 104 may store media data (e.g., music and image files), software (e.g., for implementing functions on device 100), firmware, preference information (e.g., media playback preferences), lifestyle information (e.g., food preferences), exercise information (e.g., information obtained by exercise monitoring equipment), transaction information (e.g., information such as credit card information), wireless connection information (e.g., information that may enable device 100 to establish a wireless connection), subscription information (e.g., information that keeps track of podcasts or television shows or other media a user subscribes to), contact information (e.g., telephone numbers and e-mail addresses), calendar information, pass information (e.g., transportation boarding passes, event tickets, coupons, store cards, financial payment cards, etc.), any other suitable data, or any combination thereof.

Communications component 106 may be provided to allow device 100 to communicate with one or more other electronic devices or servers using any suitable communications protocol. For example, communications component 106 may support Wi-Fi™ (e.g., an 802.11 protocol), Zig-Bee™ (e.g., an 802.15.4 protocol), WiDi™, Ethernet, Bluetooth™, Bluetooth™ Low Energy ("BLE"), high frequency systems (e.g., 900 MHz, 2.4 GHz, and 5.6 GHz communication systems), infrared, transmission control protocol/internet protocol ("TCP/IP") (e.g., any of the protocols used in each of the TCP/IP layers), Stream Control Transmission Protocol ("SCTP"), Dynamic Host Configuration Protocol ("DHCP"), hypertext transfer protocol ("HTTP"), BitTorrent™, file transfer protocol ("FTP"), real-time transport protocol ("RTP"), real-time streaming protocol ("RTSP"), real-time control protocol ("RTCP"), Remote Audio Output Protocol ("RAOP"), Real Data Transport Protocol™ ("RDTP"), User Datagram Protocol ("UDP"), secure shell protocol ("SSH"), wireless distribution system ("WDS") bridging, any communications protocol that may be used by wireless and cellular telephones and personal e-mail devices (e.g., Global System for Mobile Communications ("GSM"), GSM plus Enhanced Data rates for GSM Evolution ("EDGE"), Code Division Multiple Access ("CDMA"), Orthogonal Frequency-Division Multiple Access ("OFDMA"), high speed packet access ("HSPA"), multi-band, etc.), any communications protocol that may be used by a low power Wireless Personal Area Network ("6LoWPAN") module, any other communications protocol, or any combination thereof. Communications component 106 may also include or be electrically coupled to any suitable transceiver circuitry (e.g., transceiver circuitry or antenna 116 via bus 118) that can enable device 100 to be communicatively coupled to another device (e.g., a host computer or an accessory device) and communicate with that other device wirelessly, or via a wired connection (e.g., using a connector port). Communications component 106 may be configured to determine a geographical position of electronic device 100. For example, communications component 106 may utilize the global positioning system ("GPS") or a regional or site-wide positioning system that may use cell tower positioning technology or Wi-Fi™ technology.

Power supply 108 can include any suitable circuitry for receiving and/or generating power, and for providing such power to one or more of the other components of electronic device 100. For example, power supply 108 can be coupled to a power grid (e.g., when device 100 is not acting as a portable device or when a battery of the device is being charged at an electrical outlet with power generated by an electrical power plant). As another example, power supply 108 can be configured to generate power from a natural source (e.g., solar power using solar cells). As another example, power supply 108 can include one or more batteries for providing power (e.g., when device 100 is acting as a portable device). For example, power supply 108 can include one or more of a battery (e.g., a gel, nickel metal hydride, nickel cadmium, nickel hydrogen, lead acid, or lithium-ion battery), an uninterruptible or continuous power supply ("UPS" or "CPS"), and circuitry for processing power received from a power generation source (e.g., power generated by an electrical power plant and delivered to the user via an electrical socket or otherwise). The power can be provided by power supply 108 as alternating current or direct current, and may be processed to transform power or limit received power to particular characteristics. For example, the power can be transformed to or from direct current, and constrained to one or more values of average power, effective power, peak power, energy per pulse, voltage, current (e.g., measured in amperes), or any other characteristic of received power. Power supply 108 can be operative to request or provide particular amounts of power at different times, for example, based on the needs or requirements of electronic device 100 or periphery devices that may be coupled to electronic device 100 (e.g., to request more power when charging a battery than when the battery is already charged).

One or more input components 110 may be provided to permit a user to interact or interface with device 100. For example, input component 110 can take a variety of forms, including, but not limited to, a touch pad, dial, click wheel, scroll wheel, touch screen, one or more buttons (e.g., a keyboard), mouse, joy stick, track ball, microphone, camera, scanner (e.g., a bar code scanner or any other suitable scanner that may obtain product identifying information from a code, such as a bar code, a QR code, or the like), proximity sensor, light detector, biometric sensor (e.g., a fingerprint reader or other feature recognition sensor, which may operate in conjunction with a feature-processing application that may be accessible to electronic device 100 for authenticating a user), line-in connector for data and/or power, and combinations thereof. Each input component 110 can be configured to provide one or more dedicated control functions for making selections or issuing commands associated with operating device 100.

Electronic device 100 may also include one or more output components 112 that may present information (e.g., graphical, audible, and/or tactile information) to a user of device 100. For example, output component 112 of electronic device 100 may take various forms, including, but not limited to, audio speakers, headphones, line-out connectors for data and/or power, visual displays, infrared ports, tactile/haptic outputs (e.g., rumblers, vibrators, etc.), and combinations thereof.

As a specific example, electronic device 100 may include a display output component as output component 112. Such a display output component may include any suitable type of display or interface for presenting visual data to a user. A display output component may include a display embedded in device 100 or coupled to device 100 (e.g., a removable display). A display output component may include, for example, a liquid crystal display ("LCD"), a light emitting diode ("LED") display, an organic light-emitting diode ("OLED") display, a surface-conduction electron-emitter display ("SED"), a carbon nanotube display, a nanocrystal display, any other suitable type of display, or combination thereof. Alternatively, a display output component can include a movable display or a projecting system for providing a display of content on a surface remote from electronic device 100, such as, for example, a video projector, a head-up display, or a three-dimensional (e.g., holographic) display. As another example, a display output component may include a digital or mechanical viewfinder, such as a viewfinder of the type found in compact digital cameras, reflex cameras, or any other suitable still or video camera. A display output component may include display driver circuitry, circuitry for driving display drivers, or both, and such a display output component can be operative to display content (e.g., media playback information, application screens for applications implemented on electronic device 100, information regarding ongoing communications operations, information regarding incoming communications requests, device operation screens, etc.) that may be under the direction of processor 102.

It should be noted that one or more input components and one or more output components may sometimes be referred to collectively herein as an input/output ("I/O") component or I/O interface (e.g., input component 110 and output component 112 as I/O component or I/O interface 114). For example, input component 110 and output component 112 may sometimes be a single I/O component 114, such as a touch screen, that may receive input information through a user's touch of a display screen and that may also provide visual information to a user via that same display screen.

Processor 102 of electronic device 100 may include any processing circuitry that may be operative to control the operations and performance of one or more components of electronic device 100. For example, processor 102 may receive input signals from input component 110 and/or drive output signals through output component 112. As shown in FIG. 1, processor 102 may be used to run one or more applications, such as an application 103. Application 103 may include, but is not limited to, one or more operating system applications, firmware applications, media playback applications, media editing applications, NFC communication applications, pass applications, calendar applications, state determination applications, biometric feature-processing applications, or any other suitable applications. For example, processor 102 may load application 103 as a user interface program to determine how instructions or data received via an input component 110 or other component of device 100 may manipulate the one or more ways in which information may be stored and/or provided to the user via an output component 112. Application 103 may be accessed by processor 102 from any suitable source, such as from memory 104 (e.g., via bus 118) or from another device or server (e.g., via communications component 106). Processor 102 may include a single processor or multiple processors. For example, processor 102 may include at least one "general purpose" microprocessor, a combination of general and special purpose microprocessors, instruction set processors, graphics processors, video processors, and/or related chips sets, and/or special purpose microprocessors. Processor 102 also may include on board memory for caching purposes.

Electronic device 100 may also include near field communication ("NFC") component 120. NFC component 120 may be any suitable proximity-based communication mechanism that may enable contact-less transactions or communications between electronic device 100 and a remote terminal (e.g., a payment terminal of a merchant). NFC component 120 may allow for close range communication at relatively low data rates (e.g., 424 kbps), and may comply with any suitable standards, such as ISO/IEC 7816, ISO/IEC 18092, ECMA-340, ISO/IEC 21481, ECMA-352, ISO 14443, and/or ISO 15693. Alternatively or additionally, NFC component 120 may allow for close range communication at relatively high data rates (e.g., 560 Mbps), and may comply with any suitable standards, such as the TransferJet™ protocol. Communication between NFC component 120 and a remote terminal may occur within any suitable close range distance therebetween, such as a range of approximately 2 to 4 centimeters, and may operate at any suitable frequency (e.g., 13.56 MHz). For example, such close range communication of NFC component 120 may take place via magnetic field induction, which may allow NFC component 120 to communicate with other NFC devices and/or to retrieve information from tags having radio frequency identification ("RFID") circuitry. NFC component 120 may provide a manner of acquiring merchandise information, transferring payment information, and/or otherwise communicating with an external device (e.g., a remote merchant terminal).

NFC component 120 may include a specific NFC transceiver or NFC antenna (not shown) that may generally enable contactless proximity-based communication between NFC component 120 and a remote terminal. Alternatively or additionally, NFC component 120 may utilize the same transceiver circuitry or antenna (e.g., antenna 116) that another communication component of electronic device 100 (e.g., communication component 106) may utilize. For example, communication component 106 may leverage antenna 116 to enable Wi-Fi™, Bluetooth™, or GPS communication between electronic device 100 and another remote entity, while NFC component 120 may leverage antenna 116 to enable contactless proximity-based or NFC communication between electronic device 100 and another remote entity. NFC component 120 may share portions of processor 102 and/or may include its own processor (not shown) that may exist as a separate component, may be integrated into another chipset, or may be integrated with processor 102, for example, as part of a system on a chip ("SoC"), and that may be used to run one or more applications, such as an NFC low power mode or wallet application, which may help dictate the function of NFC component 120.

NFC component 120 may share portions of memory 104 and/or may include its own memory that may be embedded within NFC device hardware or within an NFC integrated circuit ("IC"). Such NFC memory may be tamper resistant and may include at least a portion of a secure element. Such NFC memory may store one or more applications relating to NFC communications, such as financial payment applications, secure access system applications, loyalty card applications, pass applications, and other applications, which may be encrypted. Moreover, such NFC memory may include one or more of an issuer security domain ("ISD") and a supplemental security domain ("SSD") (e.g., a service provider security domain ("SPSD"), a trusted service manager security domain ("TSMSD"), etc.), which may be defined and managed by an NFC specification standard (e.g., GlobalPlatform). For example, an ISD may be a portion of NFC memory in which a trusted service manager ("TSM") or issuing financial institution may store keys and/or other suitable information for creating or otherwise provisioning one or more credentials (e.g., credentials associated with various credit cards, bank cards, gift cards, access cards, transit passes, etc.) on electronic device 100 (e.g., via communications component 106), for credential content management, and/or security domain management. A specific supplemental security domain ("SSD") may be associated with a specific credential (e.g., a specific credit card credential or a specific public transit card credential) that may provide specific privileges or payment rights to electronic device 100. Each SSD may have its own manager key for its own application or applet that may need to be activated to enable a specific credential of that SSD for use by NFC component 120 as an NFC communication to a remote terminal. Security features may be provided for enabling use of NFC component 120 that may be particularly useful when transmitting payment information, such as credit card information or bank account information to a remote terminal. Such security features also may include a secure storage area that may have restricted access (e.g., NFC memory). For example, user authentication via personal identification number ("PIN") entry or via user interaction with a biometric sensor may need to be provided to access the secure storage area.

While NFC component 120 has been described with respect to near field communication, it is to be understood that component 120 may be configured to provide any suitable contactless proximity-based mobile payment or any other suitable type of contactless proximity-based communication between electronic device 100 and a remote terminal. For example, NFC component 120 may be configured to provide any suitable short-range communication, such as those involving electromagnetic/electrostatic coupling technologies.

Motion-sensing component 122 may include any suitable motion sensor or any suitable combination of motion sensors operative to detect movements of electronic device 100. For example, motion-sensing component 122 may include one or more three-axis acceleration motion sensors (e.g., an accelerometer) operative to detect linear acceleration in three directions (i.e., the x—or left/right direction, the y—or up/down direction, and the z—or forward/backward direction). As another example, motion-sensing component 122 may include one or more single-axis or two-axis acceleration motion sensors which may be operative to detect linear acceleration only along each of the x—or left/right direction and the y—or up/down direction, or along any other pair of directions. In some embodiments, motion-sensing component 122 may include an electrostatic capacitance (e.g., capacitance-coupling) accelerometer that may be based on silicon micro-machined micro electro-mechanical systems ("MEMS") technology, including a heat-based MEMS type accelerometer, a piezoelectric type accelerometer, a piezo-resistance type accelerometer, or any other suitable accelerometer (e.g., which may provide a pedometer or other suitable function). In some embodiments, motion-sensing component 122 may be operative to directly or indirectly detect rotation, rotational movement, angular displacement, tilt, position, orientation, motion along a non-linear (e.g., arcuate) path, or any other non-linear motions. Additionally or alternatively, motion-sensing component 122 may include one or more angular rate, inertial, and/or gyro-motion sensors or gyroscopes for detecting rotational movement. For example, motion-sensing component 122 may include one or more rotating or vibrating elements, optical gyroscopes, vibrating gyroscopes, gas rate gyroscopes, ring gyroscopes, magnetometers (e.g., scalar or vector magnetometers), compasses, and the like. Using motion-sensing component 122, electronic device 100 may be configured to determine a velocity, acceleration, orientation, and/or any other suitable motion attribute of electronic device 100.

Electronic device 100 may also be provided with a housing 101 that may at least partially enclose one or more of the components of device 100 for protection from debris and other degrading forces external to device 100. In some embodiments, one or more of the components may be provided within its own housing (e.g., input component 110 may be an independent keyboard or mouse within its own housing that may wirelessly or through a wire communicate with processor 102, which may be provided within its own housing).

Figure 2:
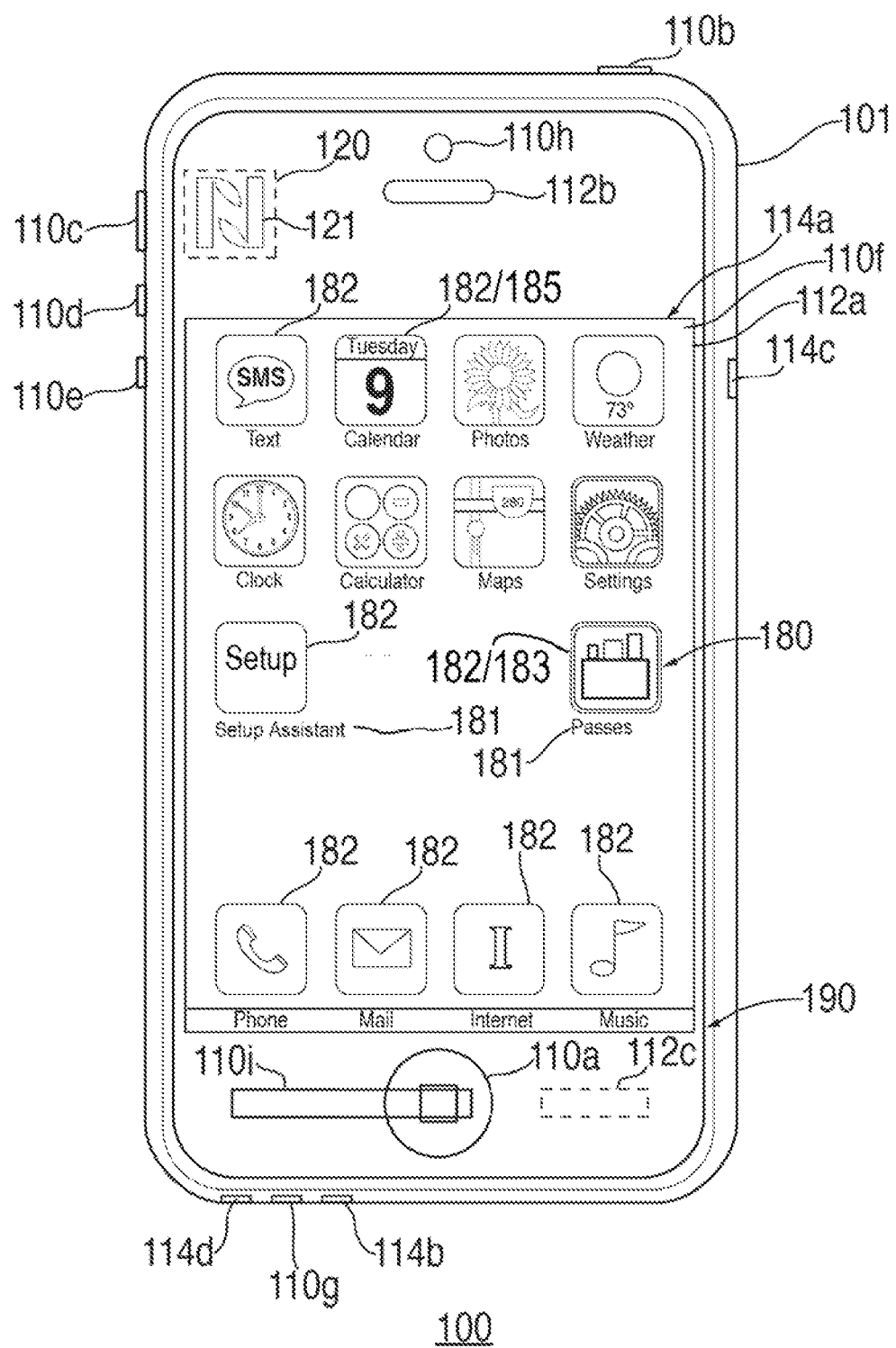
FIG. 2 is a front view of the electronic device of FIG. 1.

As shown in FIG. 2, one specific example of electronic device 100 may be a handheld electronic device, such as an iPhone™, where housing 101 may allow access to various input components 110*a*-110*i*, various output components 112*a*-112*c*, and various I/O components 114*a*-114*d* through which device 100 and a user and/or an ambient environment may interface with each other. Input component 110*a* may include a button that, when pressed, may cause a "home" screen or menu of a currently running application to be displayed by device 100. Input component 110*b* may be a button for toggling electronic device 100 between a sleep mode and a wake mode or between any other suitable modes. Input component 110c may include a two-position slider that may disable one or more output components 112 in certain modes of electronic device 100. Input components 110d and 110e may include buttons for increasing and decreasing the volume output or any other characteristic output of an output component 112 of electronic device 100. Each one of input components 110a-110e may be a mechanical input component, such as a button supported by a dome switch, a sliding switch, a control pad, a key, a knob, a scroll wheel, or any other suitable form.

An output component 112a may be a display that can be used to display a visual or graphic user interface ("GUI") 180, which may allow a user to interact with electronic device 100. GUI 180 may include various layers, windows, screens, templates, elements, menus, and/or other components of a currently running application (e.g., application 103) that may be displayed in all or some of the areas of display output component 112a. One or more of user input components 110a-110i may be used to navigate through GUI 180. For example, one user input component 110 may include a scroll wheel that may allow a user to select one or more graphical elements or icons 182 of GUI 180. Icons 182 may also be selected via a touch screen I/O component 114a that may include display output component 112a and an associated touch input component 110f. Such a touch screen I/O component 114a may employ any suitable type of touch screen input technology, such as, but not limited to, resistive, capacitive, infrared, surface acoustic wave, electromagnetic, or near field imaging. Furthermore, touch screen I/O component 114a may employ single point or multi-point (e.g., multi-touch) input sensing.

Icons 182 may represent various layers, windows, screens, templates, elements, and/or other components that may be displayed in some or all of the areas of display component 112a upon selection by the user. Furthermore, selection of a specific icon 182 may lead to a hierarchical navigation process. For example, selection of a specific icon 182 may lead from screen 190 of FIG. 2 to a new screen of GUI 180 that may include one or more additional icons or other GUI elements of the same application or of a new application associated with that icon 182. Textual indicators 181 may be displayed on or near each icon 182 to facilitate user interpretation of each graphical element icon 182. It is to be appreciated that GUI 180 may include various components arranged in hierarchical and/or non-hierarchical structures. When a specific icon 182 is selected, device 100 may be configured to open a new application associated with that icon 182 and display a corresponding screen of GUI 180 associated with that application. For example, when the specific icon 182 labeled with a "Passes" textual indicator 181 (i.e., specific icon 183) is selected, device 100 may launch or otherwise access a specific pass or wallet application (e.g., a pass application 103a, as described below with respect to FIG. 3) and may display screens of a specific user interface that may include one or more tools or features for interacting with one or more passes or other credentials (e.g., payment credentials of NFC component 120) in a specific manner. As another example, when the specific icon 182 labeled with a "Calendar" textual indicator 181 (i.e., specific icon 185) is selected, device 100 may launch or otherwise access a specific calendar or reminder application (e.g., a calendar application 103b, as described below with respect to FIG. 3) and may display screens of a specific user interface that may include one or more tools or features for interacting with one or more events or other reminders that may be time-sensitive in a specific manner. For each application, screens may be displayed on display output component 112a and may include various user interface elements. Additionally or alternatively, for each application, various other types of non-visual information may be provided to a user via various other output components 112 of device 100.

Electronic device 100 also may include various other I/O components 114 that may allow for communication between device 100 and other devices. I/O component 114b may be a connection port that may be configured for transmitting and receiving data files, such as media files or customer order files, from a remote data source and/or power from an external power source. For example, I/O component 114b may be a proprietary port, such as a Lightning™ connector or a 30-pin dock connector from Apple Inc. of Cupertino, Calif. I/O component 114c may be a connection slot for receiving a SIM card or any other type of removable component. I/O component 114d may be a headphone jack for connecting audio headphones that may or may not include a microphone component. Electronic device 100 may also include at least one audio input component 110g, such as a microphone, and at least one audio output component 112b, such as an audio speaker.

Electronic device 100 may also include at least one tactile output component 112c (e.g., a rumbler, vibrator, etc.), a camera and/or scanner input component 110h (e.g., a video or still camera, and/or a bar code scanner or any other suitable scanner that may obtain product identifying information from a code, such as a bar code, a QR code, or the like), and a biometric input component 110i (e.g., a fingerprint reader or other feature recognition sensor, which may operate in conjunction with a feature-processing application that may be accessible to electronic device 100 for authenticating a user). As shown in FIG. 2, at least a portion of biometric input component 110i may be incorporated into or otherwise combined with input component 110a or any other suitable I/O component of device 100. For example, biometric input component 110i may be a fingerprint reader that may be configured to scan the fingerprint of a user's finger as the user interacts with mechanical input component 110a by pressing input component 110a with that finger. As another example, biometric input component 110i may be a fingerprint reader that may be combined with touch input component 110f of touch screen I/O component 114a, such that biometric input component 110i may be configured to scan the fingerprint of a user's finger as the user interacts with touch screen input component 110f by pressing or sliding along touch screen input component 110f with that finger. Moreover, as mentioned, electronic device 100 may further include NFC component 120, which may be communicatively accessible to a remote terminal via antenna 116 and/or an NFC-specific antenna (not shown in FIG. 2). NFC component 120 may be located at least partially within housing 101, and a mark or symbol 121 can be provided on the exterior of housing 101 that may identify the general location of one or more of the antennas associated with NFC component 120 (e.g., the general location of antenna 116 and/or an NFC-specific antenna).

Figure 3:
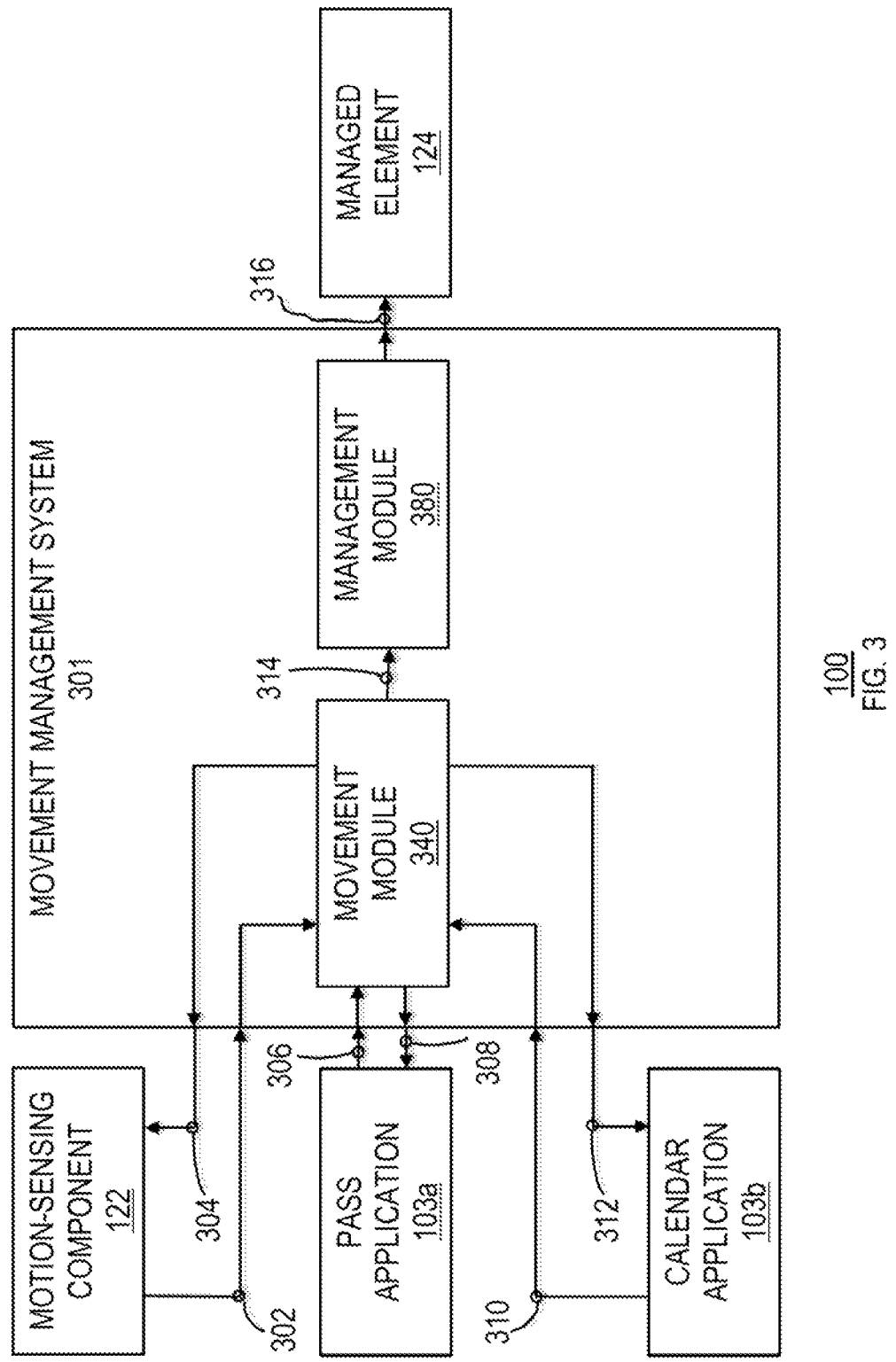
FIG. 3 is a schematic view of an illustrative portion of the electronic device of FIGS. 1 and 2.

FIG. 3 shows a schematic view of a movement management system 301 of electronic device 100 that may be provided to manage movement states of device 100 (e.g., to determine a movement state of device 100 and to manage a mode of operation of device 100 based on the determined movement state). In addition to leveraging motion sensor data that may be provided by motion-sensing component 122, movement management system 301 may leverage various other types of data accessible to device 100 in order to determine the current movement state of device 100, such as data provided by a pass application 103a of device 100 and/or data provided by a calendar application 103b of device 100. In response to determining the current movement state of device 100, movement management system 301 may apply at least one movement-based mode of operation to a managed element 124 (e.g., any suitable component and/or application) of device 100 based on the determined current movement state. For example, as shown in FIG. 3, movement management system 301 may include a movement module 340 and a management module 380.

Movement module 340 of movement management system 301 may be configured to leverage various types of data accessible to device 100 in order to determine the current movement state of device 100. As shown, movement module 340 may be configured to receive motion sensor data 302 from motion-sensing component 122. In some embodiments, motion-sensing component 122 may be configured to transmit motion sensor data 302 to movement module 340 whenever motion-sensing component 122 detects any movement above a certain threshold. In other embodiments, motion-sensing component 122 may not include any application logic and/or may always provide real-time motion sensor data 302 to movement module 340. In yet other embodiments, motion-sensing component 122 may be configured to provide motion sensor data 302 to movement module 340 in response to receiving a motion sensor data request 304 from movement management system 301 (e.g., from movement module 340). Motion sensor data 302 may be indicative of sensed data from any suitable motion sensor of motion-sensing component 122 and, in some embodiments, may be independent of any accessible data or entity remote from device 100 (e.g., motion sensor data 302 may be obtained only by motion-sensing component 122 and not in conjunction with remote devices or systems, such as a GPS system).

Movement module 340 may also be configured to leverage various other types of data accessible to device 100, in addition to motion sensor data 302, in order to determine the current movement state of device 100. As shown, movement module 340 may also be configured to receive pass data 306 from pass application 103a. Pass application 103a may be any suitable application (e.g., Passbook by Apple Inc., Google Wallet by Google Inc. of Mountain View, Calif., etc.) that may be accessible to device 100 for storing and utilizing various types of passes (e.g., transportation boarding passes, event tickets, coupons, store cards, mobile payment cards, etc.). Pass application 103a may act as a digital wallet (e.g., in conjunction with NFC component 120) for enabling device 100 to present information indicative of a pass to a merchant (e.g., via any suitable output component 112 or antenna 116 or communications component 106, etc.), which may enable a merchant to redeem the pass, and/or which may enable device 100 to update the pass with information from the merchant.

For example, pass application 103a may include a movie ticket pass, which may enable device 100 to electronically access a user's movie ticket and provide information to a movie theater merchant or administrator indicative of that movie ticket via device 100 (e.g., as a barcode via display output component 112a), where the merchant may redeem the ticket and may provide specific information to pass application 103a indicative of the redemption. For example, when the movie ticket is redeemed via pass application 103a, the merchant may communicate information to pass application 103a that may update the appropriate movie ticket pass of pass application 103a with any suitable data indicative of the redemption, such as the time and place of the redemption, the currently scheduled start time of the movie, the currently scheduled end time of the movie, the specific theater number for the movie, and the like. Such a movie ticket pass of pass application 103a may also include various other types of data, such as the rating of the movie, the length of the movie, the stars of the movie, and the like.

As another example, pass application 103a may include a credit card pass, which may enable device 100 to electronically access a user's credit card credential (e.g., in conjunction with NFC component 120) and provide payment information indicative of that credit card credential to a product merchant via device 100 (e.g., in conjunction with NFC component 120 as an NFC communication to a remote merchant terminal, such as via antenna 116), where the merchant may accept the payment and may provide specific information to pass application 103a indicative of the accepted payment. For example, when the payment is accepted by the merchant via pass application 103a, the merchant may communicate information to pass application 103a that may update the appropriate credit card pass of pass application 103a with any suitable data indicative of the payment, such as the time and place of the payment, the amount of the payment, and the like.

Pass data 306 may be any suitable information indicative of a pass that has been or may be redeemed, updated, and/or invalidated via pass application 103a, and movement module 340 may be configured to utilize such pass data 306 independently or in combination with any received motion sensor data 302 and/or any other suitable data accessible by device 100 for determining a movement state of device 100. Such pass data 306 may include any suitable information descriptive of any suitable characteristic of any suitable pass available to pass application 103a, regardless of whether or not the pass has been redeemed, invalidated, updated, or otherwise utilized at the current moment in time that pass data 306 was generated or at any other specific moment in time. For example, such pass data 306 may be indicative of a location with which the pass may be used (e.g., the name and location of a specific movie theater with which a movie ticket pass must be used), a date by which the pass must be used (e.g., a departure time of an airline ticket pass), a time at which the pass was redeemed, and the like.

In some embodiments, pass application 103a may be configured to transmit pass data 306 to movement module 340 at any suitable moment, such as whenever pass application 103a detects a selection of any pass (e.g., by a user for use with a merchant), whenever pass application 103a detects the receipt of any new information regarding the use of a pass (e.g., from a merchant when the pass is redeemed), whenever pass application 103a detects pass information related to a current moment in time or a moment in time within a threshold of the current moment in time (e.g., when a start time for a movie associated with a movie ticket pass is the current moment in time or is upcoming in ten minutes, etc.), and the like. In other embodiments, pass application 103a may be configured to provide pass data 306 to movement module 340 in response to receiving a pass data request 308 from movement module 340. For example, movement module 340 may be configured to generate and transmit pass data request 308 to pass application 103a only when movement module 340 determines that pass data 306 may be helpful for determining a current movement state of device 100. For example, movement module 340 may be configured to determine the current movement state of device 100 utilizing only motion sensor data 302 (e.g., when motion sensor data 302 is sufficient to provide movement module 340 with enough data to reliably determine the current movement state of device 100). However, movement module 340 may often times receive motion sensor data 302 that alone is insufficient to provide movement module 340 with the confidence it may need to reliably determine the current movement state of device 100. In such cases, movement module 340 may be configured to generate and transmit pass data request 308 to pass application 103a in order to receive pass data 306, such that movement module 340 may utilize pass data 306 in conjunction with motion sensor data 302 to more reliably determine the current movement state of device 100. In some embodiments, a power management state or mode of movement management system 301 (e.g., of movement module 340) may determine when pass data 306 may be provided to movement module 340. For example, when movement module 340 is in an idle, sleep, hibernation, or any other suitable lower power mode, pass application 103a may be configured to provide pass data 306 to movement module 340 when it is determined that such pass data 306 may be indicative of a probable movement state change. Alternatively, when movement module 340 is in an active or any other suitable higher power mode, movement module 340 may be configured to generate and transmit pass data request 308 to pass application 103a in order to receive pass data 306 at various suitable times, such as at any detected movement state change and/or at specific time intervals.

Movement module 340 may also be configured to utilize received pass data 306 to help determine future movement states of device 100. For example, if movement module 340 receives pass data 306 at time A, where pass data 306 may be indicative of pass application 103a having just redeemed a movie ticket pass for a movie that is to start at time B and end at time C, not only may movement module 340 be configured to utilize such pass data 306 received at time A to determine a movement state of device 100 at time A, but movement module 340 may also be configured to utilize such pass data 306 received at time A to more reliably determine a movement state of device 100 after time A (e.g., where time B follows time A, and time C follows time B). That is, movement module 340 may utilize such pass data 306 received at time A to determine a movement state of device 100 at time A by using such pass data 306 to more reliably determine that the user is most likely going to be stationary with device 100 at time A (e.g., at the moment a movie ticket is redeemed). Moreover, movement module 340 may also utilize such pass data 306 received at time A to more reliably determine that the user is most likely going to be in motion with device 100 between time A and time B, as the user may likely move from a stationary ticket redemption window to his or her seat in the movie theater. Additionally or alternatively, movement module 340 may also utilize such pass data 306 received at time A to more reliably determine that the user is most likely going to be stationary with device 100 between time B and time C, as the user is most likely going to be sitting in the movie theater between the start and end times of the movie for which a movie ticket pass has recently been redeemed. Therefore, pass data 306 may not only be utilized by movement module 340 to help movement module 340 determine a current movement state of device 100 with a higher probability at the moment such pass data 306 is received (e.g., at time A), but pass data 306 may also be utilized by movement module 340 to prepare for detecting probable future changes in the movement state of device 100 (e.g., at any time between time A and time C). This may enable electronic device 100 to save power (e.g., by reducing the processing requirements of movement module 340 during a time frame for which module 340 may already have a specific level of confidence due to previously received pass data 306 (e.g., between the start and end times of a movie for which a movie ticket pass has recently been redeemed, between the departure and arrival times of an airline flight for which an airline ticket pass has recently been redeemed, etc.)).

Specific descriptive data of a pass may be included in pass data 306 that may be used to determine the likelihood of a user to be moving or stationary with device 100 in relation to the pass. For example, if the pass is for a walking tour of a museum, then pass data 306 may be indicative of this, and movement module 340 may be configured to utilize this data to more reliably determine that the user is most likely going to be in motion with device 100 during the time frame associated with the pass. Alternatively, if the pass is for a movie, then pass data 306 may be indicative of this, and movement module 340 may be configured to utilize this data to more reliably determine that the user is most likely going to be stationary with device 100 during the time frame associated with the pass.

Movement module 340 may also be configured to leverage various other types of data accessible to device 100, in addition to motion sensor data 302 and/or in addition to pass data 306, in order to determine the current movement state of device 100. As shown, movement module 340 may also be configured to receive calendar data 310 from calendar application 103b. Calendar application 103b may be any suitable application (e.g., iCal™ by Apple Inc. or Outlook™ by Microsoft Corporation of Redmond, Wash.) that may be accessible to device 100 for storing and detecting various temporal calendar events (e.g., meetings, parties, conference calls, etc.). Calendar application 103b may act as an electronic calendar (e.g., in conjunction with a clock or other temporal sensor of device 100) for enabling device 100 to present information indicative of a temporal calendar event to a user at an appropriate time (e.g., as a reminder via any suitable output component 112). For example, calendar application 103b may include information defining a business meeting temporal calendar event, which may include a start time for the event, an end time for the event, a location for the event, attendees of the event, a description of the purpose of the event, and the like. When device 100 detects that a temporal sensor of device 100 indicates a time within a particular threshold of a start time of the business meeting temporal calendar event, calendar application 103b may provide a reminder to a user of device 100 about the event.

Calendar data 310 may be any suitable information indicative of a temporal calendar event that has started, ended, or may be upcoming via calendar application 103b, and movement module 340 may be configured to utilize such calendar data 310 independently or in combination with any received motion sensor data 302 and/or any other suitable data accessible by device 100 for determining a movement state of device 100. Such calendar data 310 may include any suitable information descriptive of any suitable characteristic of any suitable temporal calendar event available to calendar application 103b, regardless of whether or not the temporal calendar event has already started, already ended, or otherwise been updated or utilized at the current moment in time that calendar data 310 may be generated and/or at any other specific moment in time. For example, such calendar data 310 may be indicative of a location at which a temporal calendar event has or will take place (e.g., the name and location of a specific building or conference room or geo-fence at which a temporal calendar event is scheduled), a start time of the temporal calendar event, an end time of the temporal calendar event, a length of the temporal calendar event, and the like.

Movement module 340 may also be configured to utilize received calendar data 310 to help determine future movement states of device 100. For example, if movement module 340 receives calendar data 310 at time A, where calendar data 310 may be indicative of calendar application 103b having just provided a five minute advance reminder to a user for a business meeting temporal calendar event that is to start at time B and end at time C, not only may movement module 340 be configured to utilize such calendar data 310 received at time A to determine a movement state of device 100 at time A, but movement module 340 may also be configured to utilize such calendar data 310 received at time A to more reliably determine a movement state of device 100 after time A (e.g., where time B follows time A, and time C follows time B). That is, movement module 340 may utilize such calendar data 310 received at time A to determine a movement state of device 100 at time A by using such calendar data 310 to more reliably determine that the user is most likely going to be in movement with device 100 at time A (e.g., as the user may be in transit to the location of a business meeting temporal calendar event at the reminder time before the business meeting temporal calendar event is to begin). Moreover, movement module 340 may also utilize such calendar data 310 received at time A to more reliably determine that the user is most likely going to be stationary with device 100 between time B and time C, as the user is most likely going to be sitting in the meeting location between the start and end times of the business meeting temporal calendar event for which a user has just been reminded. Therefore, calendar data 310 may not only be utilized by movement module 340 to help movement module 340 determine a current movement state of device 100 with a higher probability at time A when such calendar data 310 may be received, but calendar data 310 may also be utilized by movement module 340 to prepare for detecting probable future changes in the movement state of device 100 at any time after time A (e.g., between time B and time C). This may enable electronic device 100 to save power (e.g., by reducing the processing requirements of movement module 340 during a time frame for which module 340 may already have a specific level of confidence due to previously received calendar data 310 (e.g., between the start and end times of a business meeting temporal calendar event for which a five minute reminder was recently provided to a user, etc.)).

Specific descriptive data of a temporal calendar event may be included in calendar data 310 that may be used by movement management system 301 (e.g., by movement module 340) to determine the likelihood of a user to be moving or stationary with device 100 in relation to the temporal calendar event. For example, if the temporal calendar event is for a jogging date with a friend, then calendar data 310 may be indicative of this, and movement module 340 may be configured to utilize this data to more reliably determine that the user is most likely going to be in motion with device 100 during the time frame associated with the "jogging" temporal calendar event. Alternatively, if the temporal calendar event is for a dinner date with a friend, then calendar data 310 may be indicative of this, and movement module 340 may be configured to utilize this data to more reliably determine that the user is most likely going to be stationary with device 100 during the time frame associated with the "dinner" temporal calendar event.

In some embodiments, calendar application 103b may be configured to transmit calendar data 310 to movement module 340 at any suitable moment, such as whenever calendar application 103b detects the receipt of any new information regarding a temporal calendar event (e.g., from a user creating a new temporal calendar event), whenever calendar application 103b detects calendar information related to a current moment in time or a moment in time within a threshold of the current moment in time (e.g., when a reminder time, a start time, an end time, or any time therebetween for a temporal calendar event is the current moment in time or is upcoming in ten minutes, etc.), and the like. In other embodiments, calendar application 103b may be configured to provide calendar data 310 to movement module 340 in response to receiving a calendar data request 312 from movement module 340. For example, movement module 340 may be configured to generate and transmit calendar data request 312 to calendar application 103b only when movement module 340 determines that calendar data 310 may be helpful for determining a current movement state of device 100. For example, movement module 340 may be configured to determine the current movement state of device 100 utilizing only motion sensor data 302 (e.g., when motion sensor data 302 is sufficient to provide movement module 340 with enough data to reliably determine the current movement state of device 100). However, movement module 340 may often times receive motion sensor data 302 that alone is insufficient to provide movement module 340 with the confidence it may need to reliably determine the current movement state of device 100. In such cases, movement module 340 may be configured to generate and transmit calendar data request 312 to calendar application 103b in order to receive calendar data 310, such that movement module 340 may utilize calendar data 310 in conjunction with motion sensor data 302 to more reliably determine the current movement state of device 100. As another example, movement module 340 may be configured to determine the current movement state of device 100 utilizing only motion sensor data 302 and pass data 306 (e.g., when motion sensor data 302 and pass data 306 together is sufficient to provide movement module 340 with enough data to reliably determine the current movement state of device 100). However, movement module 340 may often times receive motion sensor data 302 and pass data 306 that together may be insufficient to provide movement module 340 with the confidence it may need to reliably determine the current movement state of device 100. In such cases, movement module 340 may be configured to generate and transmit calendar data request 312 to calendar application 103b in order to receive calendar data 310, such that movement module 340 may utilize calendar data 310 in conjunction with motion sensor data 302 and pass data 306 to more reliably determine the current movement state of device 100. As yet another example, movement module 340 may be configured to determine the current movement state of device 100 utilizing only pass data 306 (e.g., when pass data 306 is sufficient to provide movement module 340 with enough data to reliably determine the current movement state of device 100). However, movement module 340 may often times receive pass data 306 that alone may be insufficient to provide movement module 340 with the confidence it may need to reliably determine the current movement state of device 100. In such cases, movement module 340 may be configured to generate and transmit calendar data request 312 to calendar application 103b in order to receive calendar data 310, such that movement module 340 may utilize calendar data 310 in conjunction with pass data 306 to more reliably determine the current movement state of device 100.

Movement module 340 may be configured to prioritize or rank various data sources (e.g., motion-sensing component 122, pass application 103a, calendar application 103b, etc.) based on various factors, including degree of confidence in the accuracy of the data from each source, power consumption associated with collecting the data from each source, the specific type of data received at a specific moment in time from each source, and the like. In some embodiments, movement module 340 may only request non-motion sensor data (e.g., pass data 306 from pass application 103a (e.g., via pass data request 308) and/or calendar data 310 from calendar application 103b (e.g., via calendar data request 312)) when a potential movement state change is detected based on motion sensor data 302. In such embodiments, the requested non-motion sensor data may bolster or hinder confidence in the detected potential movement state change and help movement module 340 determine whether or not to determine that a movement state change has occurred. Once movement module 340 has determined a current movement state of device 100 (e.g., based on one or more of motion sensor data 302, pass data 306, calendar data 310, and/or any other suitable data accessible by device 100), movement module 340 may be configured to generate and transmit movement state data 314 to management module 380, where movement state data 314 may be indicative of the determined movement state of device 100 (e.g., stationary or in motion). In some embodiments, movement module 340 may be configured to generate appropriate movement state data 314 at least based on the most recently received motion sensor data 302 from motion-sensing component 122 as well as the previously received motion sensor data 302 from motion-sensing component 122, which may help enable movement module 340 to determine whether device 100 has just changed movement states or is maintaining a current movement state (e.g., whether device 100 has changed from a stationary movement state to an in motion movement state, whether device 100 has changed from an in motion movement state to a stationary movement state, whether device 100 has maintained a stationary movement state, or whether device 100 has maintained an in motion movement state). As just one example, when received motion sensor data 302 is detected to be constantly transitioning between moving and stationary, movement module 340 may choose to access or otherwise at least partially rely on other sources of data (e.g., pass application 103a and/or calendar application 103b), which may provide movement module 340 with additional data to help determine whether the movement state of device 100 should remain as one of in motion or stationary despite these detected transitions from motion sensor data 302. In response to relying on such additional data, movement module 340 may be configured to more reliably provide movement state data 314.

In response to determining the current movement state of device 100 by receiving movement state data 314, management module 380 may be configured to apply at least one movement-based mode of operation to at least one managed element 124 of device 100 based on the determined current movement state. For example, as shown in FIG. 3, movement management system 301 may include management module 380, which may be configured to receive movement state data 314 from movement module 340, as well as to generate and transmit movement mode data 316 to at least one managed element 124 of device 100 at least partially based on the received movement state data 314, where such movement mode data 316 may be received by managed element 124 for controlling at least one characteristic of managed element 124. Managed element 124 may be any suitable component and/or any suitable application of device 100, and movement mode data 316 may control managed element 124 in any suitable way, such as by enhancing, enabling, disabling, restricting, and/or limiting one or more certain functionalities associated with an application or component of device 100. Management module 380 may be configured to generate appropriate movement mode data 316 for an appropriate managed element 124 based on received movement state data 314 from movement module 340 as well as based on any other suitable data available to device 100, such as current location data indicative of the current location of device 100 (e.g., GPS information from communications component 106), current power capacity of device 100 (e.g., of power supply 108), and the like.

Figure 4:
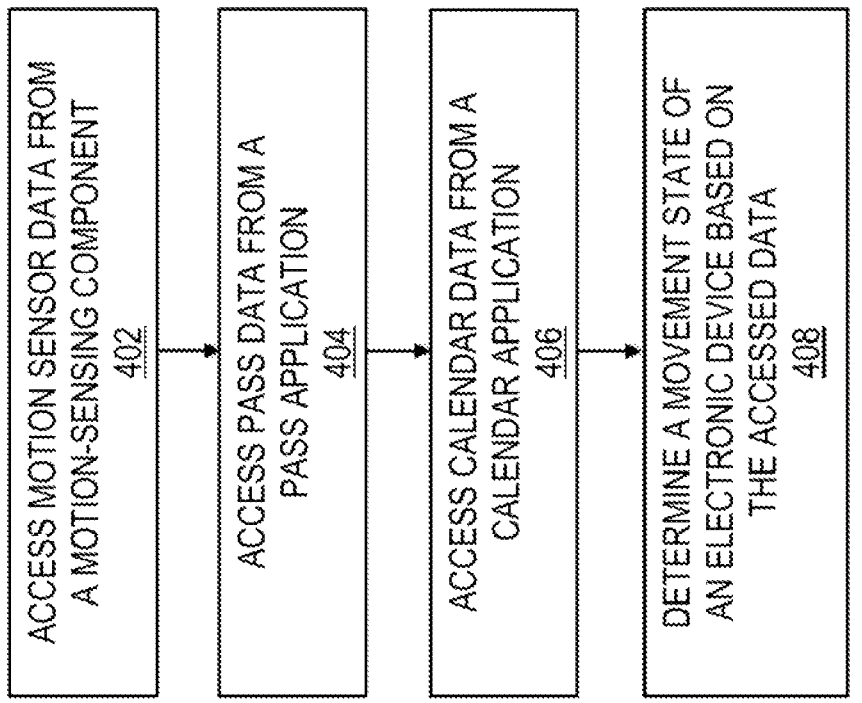
FIG. 4 is a flowchart of an illustrative process for managing movement states of an electronic device.

FIG. 4 is a flowchart of an illustrative process 400 for operating an electronic device. At step 402 of process 400, motion sensor data may be accessed from a motion-sensing component. For example, as described with respect to FIG. 3, movement module 340 of electronic device 100 may access motion sensor data 302 from motion-sensing component 122. At step 404 of process 400, pass data may be accessed from a pass application. For example, as described with respect to FIG. 3, movement module 340 of electronic device 100 may access pass data 306 from pass application 103a. At step 406 of process 400, calendar data may be accessed from a calendar application. For example, as described with respect to FIG. 3, movement module 340 of electronic device 100 may access calendar data 310 from calendar application 103b. Then, at step 408 of process 400, a movement state of the electronic device may be determined based on the accessed data. For example, as described with respect to FIG. 3, movement module 340 of electronic device 100 may generate movement state data 314 based on motion sensor data 302, pass data 306, and calendar data 310.

It is understood that the steps shown in process 400 of FIG. 4 are merely illustrative and that existing steps may be modified or omitted, additional steps may be added, and the order of certain steps may be altered. For example, in some embodiments, process 400 may omit step 406, such that step 408 may include determining a movement state based on the accessed motion sensor data of step 402 and the accessed pass data of step 404 but not based on any calendar data. In such embodiments, the pass data accessed at step 404 may include pass information descriptive of a pass, and the determining of step 408 may include detecting that the pass information is descriptive of at least one pass time for the pass, such as a redemption time of the pass, an event start time associated with the pass, and an event end time associated with the pass. For example, in some embodiments, the pass data accessed at step 404 may be indicative of a time when a pass associated with an event (e.g., a ticket associated with entrance to a movie or airline flight) has been redeemed, when the event starts, and/or when the event ends.

Moreover, one, some, or all of the processes described with respect to FIGS. 1-4 may each be implemented by software, but may also be implemented in hardware, firmware, or any combination of software, hardware, and firmware. They each may also be embodied as machine- or computer-readable code recorded on a machine- or computer-readable medium. The computer-readable medium may be any data storage device that can store data or instructions which can thereafter be read by a computer system. Examples of such a non-transitory computer-readable medium (e.g., memory 104 of FIG. 1) may include, but are not limited to, read-only memory, random-access memory, flash memory, CD-ROMs, DVDs, magnetic tape, removable memory cards, optical data storage devices, and the like. The computer-readable medium can also be distributed over network-coupled computer systems so that the computer-readable code is stored and executed in a distributed fashion. For example, the computer-readable medium may be communicated from one electronic device to another electronic device using any suitable communications protocol (e.g., the computer-readable medium may be communicated to electronic device 100 via communications component 106 (e.g., as at least a portion of application 103)). Such a transitory computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any or each module of movement management system 301 may be provided as a software construct, firmware construct, one or more hardware components, or a combination thereof. For example, any or each module of movement management system 301 may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules of movement management system 301 are merely illustrative, and that the number, configuration, functionality, and interconnection of existing modules may be modified or omitted, additional modules may be added, and the interconnection of certain modules may be altered.

At least a portion of one or more of the modules of movement management system 301 may be stored in or otherwise accessible to device 100 in any suitable manner (e.g., in memory 104 of device 100 (e.g., as at least a portion of application 103)). Any or each module of movement management system 301 may be implemented using any suitable technologies (e.g., as one or more integrated circuit devices), and different modules may or may not be identical in structure, capabilities, and operation. Any or all of the modules or other components of movement management system 301 may be mounted on an expansion card, mounted directly on a system motherboard, or integrated into a system chipset component (e.g., into a "north bridge" chip).

Any or each module of movement management system 301 may be a dedicated system implemented using one or more expansion cards adapted for various bus standards. For example, all of the modules may be mounted on different interconnected expansion cards or all of the modules may be mounted on one expansion card. With respect to movement management system 301, by way of example only, the modules of movement management system 301 may interface with a motherboard or processor 102 of device 100 through an expansion slot (e.g., a peripheral component interconnect ("PCI") slot or a PCI express slot). Alternatively, movement management system 301 need not be removable but may include one or more dedicated modules that may include memory (e.g., RAM) dedicated to the utilization of the module. In other embodiments, movement management system 301 may be at least partially integrated into device 100. For example, a module of movement management system 301 may utilize a portion of device memory 104 of device 100. Any or each module of movement management system 301 may include its own processing circuitry and/or memory. Alternatively, any or each module of movement management system 301 may share processing circuitry and/or memory with any other module of movement management system 301 and/or processor 102 and/or memory 104 of device 100.

One or more Application Programming Interfaces ("APIs") may be used in some embodiments (e.g., with respect to movement management system 301 or any other suitable module or any other suitable portion of any suitable module of movement management system 301). An API may be an interface implemented by a program code component or hardware component (hereinafter "API-implementing component") that may allow a different program code component or hardware component (hereinafter "API-calling component") to access and use one or more functions, methods, procedures, data structures, classes, and/or other services provided by the API-implementing component. An API can define one or more parameters that may be passed between the API-calling component and the API-implementing component.

An API may allow a developer of an API-calling component, which may be a third party developer, to leverage specified features provided by an API-implementing component. There may be one API-calling component or there may be more than one such component. An API can be a source code interface that a computer system or program library may provide in order to support requests for services from an application. An operating system ("OS") can have multiple APIs to allow applications running on the OS to call one or more of those APIs, and a service (e.g., a program library) can have multiple APIs to allow an application that uses the service to call one or more of those APIs. An API can be specified in terms of a programming language that can be interpreted or compiled when an application is built.

In some embodiments, the API-implementing component may provide more than one API, each providing a different view of or with different aspects that access different aspects of the functionality implemented by the API-implementing component. For example, one API of an API-implementing component can provide a first set of functions and can be exposed to third party developers, and another API of the API-implementing component can be hidden (e.g., not exposed) and can provide a subset of the first set of functions and can also provide another set of functions, such as testing or debugging functions which are not in the first set of functions. In other embodiments, the API-implementing component may itself call one or more other components via an underlying API and may thus be both an API-calling component and an API-implementing component.

An API may define the language and parameters that API-calling components may use when accessing and using specified features of the API-implementing component. For example, an API-calling component may access the specified features of the API-implementing component through one or more API calls or invocations (e.g., embodied by function or method calls) exposed by the API and may pass data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls may be transferred via the one or more application programming interfaces between the calling component (e.g., API-calling component) and an API-implementing component. Transferring the API calls may include issuing, initiating, invoking, calling, receiving, returning, or responding to the function calls or messages. Thus, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list, or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module. It should be understood that the API-implementing component and the API-calling component may be the same or different type of module from each other. API-implementing components may in some cases be embodied at least in part in firmware, microcode, or other hardware logic. In some embodiments, an API may allow a client program to use the services provided by a Software Development Kit ("SDK") library. In other embodiments, an application or other client program may use an API provided by an Application Framework. In such embodiments, the application or client program may incorporate calls to functions or methods provided by the SDK and provided by the API or may use data types or objects defined in the SDK and provided by the API. An Application Framework may, in these embodiments, provide a main event loop for a program that responds to various events defined by the Framework. The API may allow the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, and the like, and the API may be implemented in part by firmware, microcode, or other low level logic that may execute in part on the hardware component.

The API-calling component may be a local component (i.e., on the same data processing system as the API-implementing component) or a remote component (i.e., on a different data processing system from the API-implementing component) that may communicate with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that may be exposed to a different API-calling component.

The API may allow multiple API-calling components written in different programming languages to communicate with the API-implementing component, such that the API may include features for translating calls and returns between the API-implementing component and the API-calling component. However, the API may be implemented in terms of a specific programming language. An API-calling component can, in some embodiments, call APIs from different providers, such as a set of APIs from an OS provider and another set of APIs from a plug-in provider and another set of APIs from another provider (e.g., the provider of a software library) or creator of the another set of APIs.

Figure 5:
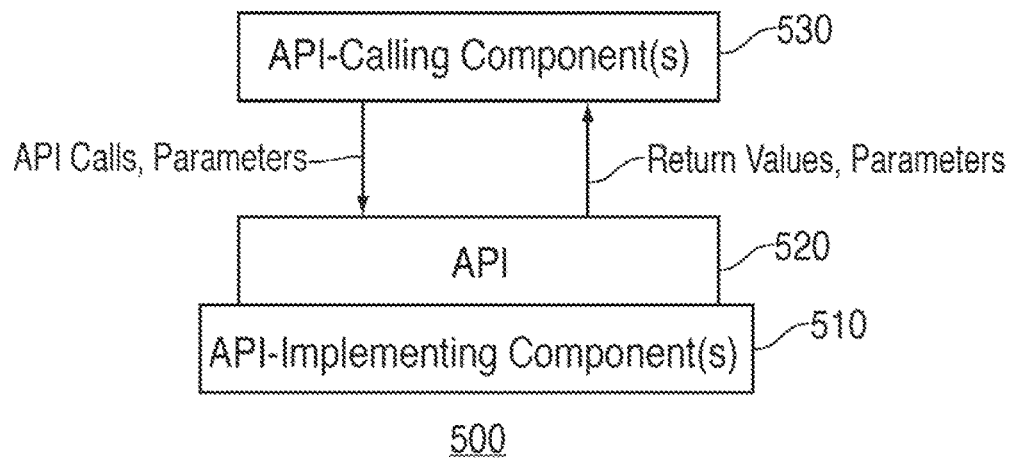
FIG. 5 is a block diagram of an illustrative application programming interface ("API") architecture.

FIG. 5 is a block diagram illustrating an exemplary API architecture 500, which may be used in some embodiments of the invention. As shown in FIG. 5, the API architecture 500 may include an API-implementing component 510 (e.g., an operating system, a library, a device driver, an API, an application program, software, or other module) that may implements an API 520. API 520 may specify one or more functions, methods, classes, objects, protocols, data structures, formats, and/or other features of API-implementing component 510 that may be used by an API-calling component 530. API 520 can specify at least one calling convention that may specify how a function in API-implementing component 510 may receive parameters from API-calling component 530 and how the function may return a result to API-calling component 530. API-calling component 530 (e.g., an operating system, a library, a device driver, an API, an application program, software, or other module), may make API calls through API 520 to access and use the features of API-implementing component 510 that may be specified by API 520. API-implementing component 810 may return a value through API 520 to API-calling component 530 in response to an API call.

It is to be appreciated that API-implementing component 510 may include additional functions, methods, classes, data structures, and/or other features that may not be specified through API 520 and that may not be available to API-calling component 530. It is to be understood that API-calling component 530 may be on the same system as API-implementing component 510 or may be located remotely and may access API-implementing component 510 using API 520 over a network. While FIG. 6 illustrates a single API-calling component 530 interacting with API 520, it is to be understood that other API-calling components, which may be written in different languages than, or the same language as, API-calling component 530, may use API 520.

API-implementing component 510, API 520, and API-calling component 530 may each be implemented by software, but may also be implemented in hardware, firmware, or any combination of software, hardware, and firmware. They each may also be embodied as machine- or computer-readable code recorded on a machine- or computer-readable medium. The computer-readable medium may be any data storage device that can store data or instructions which can thereafter be read by a computer system. Examples of such a non-transitory computer-readable medium (e.g., memory 104 of FIG. 1) may include, but are not limited to, read-only memory, random-access memory, flash memory, CD-ROMs, DVDs, magnetic tape, removable memory cards, optical data storage devices, and the like. The computer-readable medium can also be distributed over network-coupled computer systems so that the computer-readable code is stored and executed in a distributed fashion. For example, the computer-readable medium may be communicated from one electronic device to another electronic device using any suitable communications protocol (e.g., the computer-readable medium may be communicated to electronic device 100 via communications component 106 (e.g., as at least a portion of application 103)). Such a transitory computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

Figure 6:
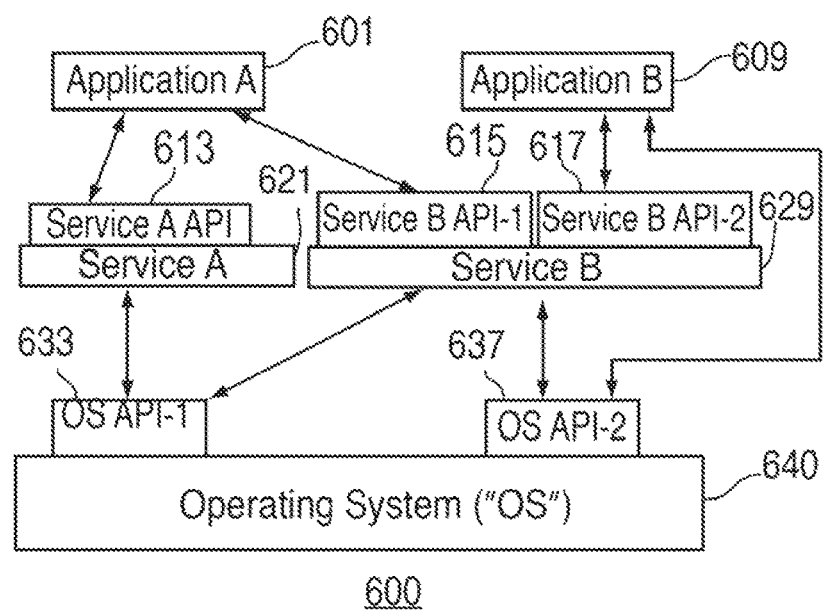
FIG. 6 is a block diagram of an illustrative API software stack.

FIG. 6 is a block diagram illustrating an exemplary software stack 600, which may be used in some embodiments of the invention. As shown in FIG. 6, Application A 601 and Application B 609 can make calls to Service A 621 or Service B 629 using several Service APIs (e.g., Service APIs 613, 615, and 617) and to Operating System ("OS") 640 using several OS APIs (e.g., OS APIs 633 and 637). Service A 621 and Service B 629 can make calls to OS 640 using several OS APIs (e.g., OS APIs 633 and 637).

For example, as shown in FIG. 6, Service B 629 may include two APIs, one of which (i.e., Service B API-1 615) may receive calls from and return values to Application A 601 and the other of which (i.e., Service B API-2 617) may receive calls from and return values to Application B 609. Service A 621, which can be, for example, a software library, may make calls to and receive returned values from OS API-1 633, and Service B 629, which can be, for example, a software library, may make calls to and receive returned values from both OS API-1 633 and OS API-2 637. Application B 609 may make calls to and receive returned values from OS API-2 637.

While there have been described systems, methods, and computer-readable media for managing movement states of an electronic device, it is to be understood that many changes may be made therein without departing from the spirit and scope of the subject matter described herein in any way. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

Therefore, those skilled in the art will appreciate that the invention can be practiced by other than the described embodiments, which are presented for purposes of illustration rather than of limitation.

What is claimed is:

1. A method for operating an electronic device comprising:
   accessing pass data from a pass application of the electronic device, wherein:
      the pass data comprises pass information descriptive of a pass available to the pass application;
      the pass is a ticket redeemable via the pass application for access to a pass event; and
      the pass information is indicative of:
         at least one pass time of the following different pass times for the pass:
            a redemption time associated with the redemption of the pass that is no later than a current time;
            an event start time associated with the start of the pass event that is no later than the current time; and
            an event end time associated with the end of the pass event that is no earlier than the current time; and
         an event type for the pass event, wherein the event type for the pass event comprises at least one of a stationary event type and an in motion event type; and
   determining a current movement state of the electronic device at the current time based on the event type for the pass event and the at least one pass time indicated by the pass information of the accessed pass data, wherein the determined current movement state comprises one of a stationary state of the electronic device and an in motion state of the electronic device.

2. The method of claim 1, further comprising accessing calendar data from a calendar application of the electronic device, wherein the accessed calendar data comprises calendar information descriptive of a calendar event scheduled for a time that is concurrent with the determining, and wherein the determining comprises determining the movement state of the electronic device based on the event type for the pass event and the at least one pass time and the accessed calendar data.

3. The method of claim 2, wherein:
   the determining comprises detecting that the calendar information is descriptive of an event type for the calendar event; and
   the event type for the calendar event comprises at least one of a sedentary event type and an active event type.

4. The method of claim 1, wherein the at least one pass time is associated with a time that is concurrent with the determining.

5. The method of claim 1, wherein the at least one pass time comprises each one of:
   the redemption time;
   the event start time; and
   the event end time.

6. The method of claim 1, wherein the at least one pass time comprises at least two of:
   the redemption time;
   the event start time; and
   the event end time.

7. The method of claim 1, wherein the at least one pass time comprises the redemption time.

8. The method of claim 7, wherein the at least one pass time further comprises at least one of the event start time and the event end time.

9. The method of claim 1, wherein the at least one pass time comprises the event start time and the event end time.

10. The method of claim 1, further comprising applying at least one movement-based mode of operation to the electronic device based on the determined movement state.

11. The method of claim 1, wherein the at least one pass time comprises the event start time.

12. The method of claim 1, wherein the pass event is one of a movie, a stage production, and a sporting event.

13. The method of claim 1, wherein the pass event is a travel itinerary.

14. A method for operating an electronic device comprising:
   accessing motion sensor data from a motion-sensing component of the electronic device;
   accessing pass data from a pass application of the electronic device; and
   determining a current movement state of the electronic device at a current time based on the accessed motion sensor data and the accessed pass data, wherein:

the accessed pass data comprises pass information descriptive of a pass to a pass event; and
the determining comprises:
    detecting that the pass information of the accessed pass data is descriptive of the following:
        an event start time for the pass event that is no later than the current time;
        an event end time for the pass event that is no earlier than the current time; and
        an event type for the pass event; and
    in response to the detecting, defining the current movement state of the electronic device to be:
        a stationary state of the electronic device when the event type is indicative of a sedentary type of event; and
        an in motion state of the electronic device when the event type is indicative of an active type of event.

15. The method of claim 14, wherein:
the pass is a ticket to the pass event; and
the pass event is one of a movie, stage production, sporting event, tour event, and travel itinerary.

16. The method of claim 14, wherein one of the event start time and the event end time is concurrent with the determining.

17. The method of claim 14, wherein the detecting further comprises detecting that the pass information is descriptive of a pass redemption time for the pass event that is no later than the current time.

18. The method of claim 14, further comprising applying at least one movement based mode of operation to the electronic device based on the determined current movement state.

19. The method of claim 14, further comprising accessing calendar data from a calendar application of the electronic device, wherein the determining comprises determining the movement state of the electronic device based on the accessed motion sensor data, the accessed calendar data, and the accessed pass data.

20. The method of claim 19, wherein the accessed calendar data comprises calendar information descriptive of a calendar event scheduled for a time that is concurrent with the determining.

21. The method of claim 14, wherein:
the method further comprises determining a future movement state of the electronic device based on the accessed pass data.

22. The method of claim 14, wherein the determining the current movement state of the electronic device comprises determining that the electronic device is one of currently moving and currently stationary.

23. An electronic device comprising:
a motion-sensing component; and
a processor configured to:
    access motion sensor data from the motion-sensing component;
    access pass data from a pass application; and
    determine a current movement state of the electronic device, wherein:
        the accessed pass data comprises pass information relating to the following:
            a pass associated with entry to an event;
            a time frame associated with the event that comprises a time that is concurrent with the processor determining the movement state; and
            an indication of a type of movement associated with the event;
        the type of movement comprises one of stationary and in motion;
        the processor is configured to determine the current movement state of the electronic device based on the accessed motion sensor data and the indication of the type of movement of the pass information of the accessed pass data;
        the processor is configured to determine the current movement state of the electronic device to be a stationary state when the indication of the type of movement associated with the event indicates the stationary movement type of movement; and
        the processor is configured to determine the current movement state of the electronic device to be an in motion state when the indication of the type of movement associated with the event indicates the in motion movement type of movement.

24. The electronic device of claim 23, wherein:
the processor is further configured to access calendar data from a calendar application; and
the processor is configured to determine the movement state based on the accessed motion sensor data, the accessed pass data, and the accessed calendar data.

* * * * *